H. A. WILLS.

Improvement in Machines for Finishing Horse Shoe Nails.

No. 5,249. Reissued Jan. 21, 1873.

Witnesses:

A. W. Almquist

Geo. W. Mabee

Inventor:

H. A. Wills

Munn & Co

Attorneys.

AM. PHOTO-LITHOGRAPHIC CO. N.Y. (OSBORNE'S PROCESS.)

UNITED STATES PATENT OFFICE.

HARRY A. WILLS, OF VERGENNES, VERMONT, ASSIGNOR TO JULIA A. WILLS AND LUCY S. KINGSLAND.

IMPROVEMENT IN MACHINES FOR FINISHING HORSESHOE-NAILS.

Specification forming part of Letters Patent No. 122,876, dated January 16, 1872; reissue No. 5,249, dated January 21, 1873.

*To all whom it may concern:*

Be it known that I, HARRY A. WILLS, of Vergennes, in the county of Addison and State of Vermont, have invented a new and Improved Machine for Cold-Rolling Horseshoe-Nails; and I do hereby declare the following to be a full, clear, and exact description of the same, reference being had to the accompanying drawing forming a part of this specification:

My invention consists in certain improvements in a machine for cold-rolling horseshoe-nails after they have been formed, to harden and finish them, in which the guide of a feeding-screw that is used to conduct the nails to the pusher, by which they are delivered to the dies, is arranged to change the nails from a vertical to a horizontal position, so that they can be delivered to horizontal dies. Previous to the movement of the device which thus delivers the nails a reciprocating bar carrying a roller-die is caused to advance to the left over the bed-die, for the purpose of acting on a swinging-bar or nail-head holder, and also to enable the roller-die to act as a stop and holding-device for the nails, the same being fed forward, point foremost, beneath it, until their heads come into contact with it. The said head-holder is hung above the bed-die and arranged to come over the head of the nail as soon as the roller-die passes therefrom toward the point, and prevents the nail from bending upward by the action of the roller. The clamping-dies open when the roller-die passes off the point of the nail, the head-holder recedes, and a pusher discharges the rolled nail.

The invention will now be fully described and then clearly pointed out in the claims.

Figure 1:
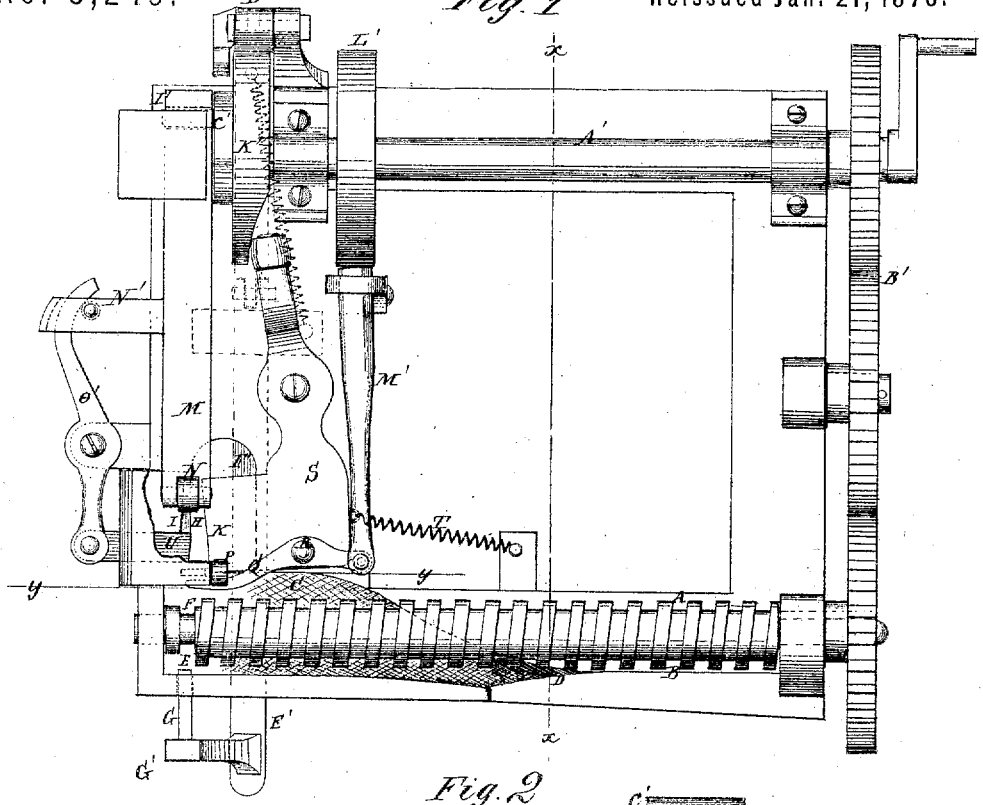
Figure 2:
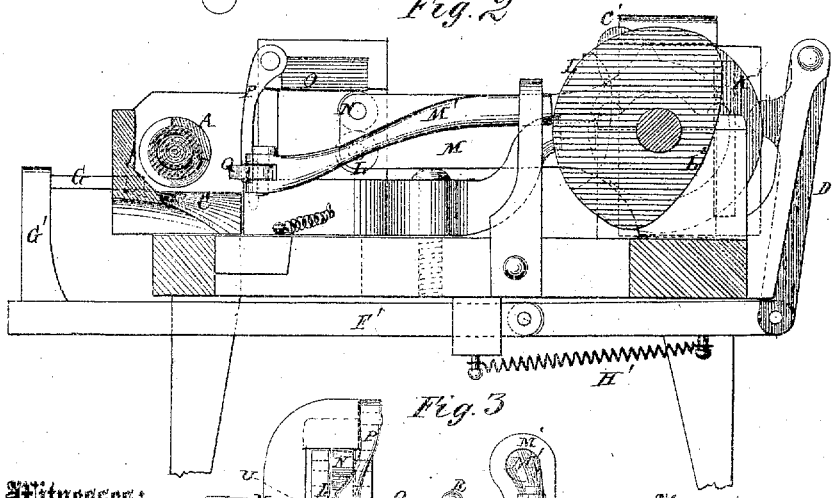
Figure 3:
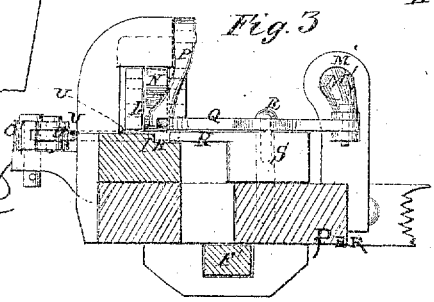

Figure 1 is a plan view of my improved machine with a part broken away; and Fig. 2 is a transverse sectional elevation of the same, taken on the line *x x*, Fig. 1. Fig. 3 is a cross-section through *y y*, Fig. 1.

Similar letters of reference indicate corresponding parts.

A represents a screw-feeder with a vertical guide at B, such as have been used before for feeding nails point downward, the nails being placed in the grooves of the screw and between it and the side B, and held against falling through by the heads. Now, in order to utilize this kind of feeding apparatus for delivering the nails horizontally to horizontal dies I provide a scroll-shaped or approximately scroll-shaped lip, C, upon the guide B under the screw, gradually turning from a vertical line, where the nail first comes against it at D, to a horizontal position at E, where the screw-thread ends and ceases to act on it, leaving it under a groove, F, in the screw for allowing the head to pass under it; or a channel may be formed in the lip for the nail to drop into instead of the groove. G is a pusher, which is arranged to work through the vertical part of the guide, to come against the head of the nail when left on the horizontal part of the lip C, and push it upon a bed-die or former, H, between a fixed die, I, and a movable one, K, which close laterally against the narrow sides of the nail to hold it on the bed-die for being rolled; also for pressing and smoothing the sides. L is the roller-die, mounted at the side and one end of the reciprocating bar M, which works under the stationary guide-former O, the face of which is the reverse of the upper side of the nail, and carries the roller-die to act with requisite pressure on all parts thereof, beginning at the highest part of the head and rolling down to a point. This roller-die is pushed forward to the left, Fig. 2, before the nail is pushed forward, point foremost, under it by the pusher G, until the highest part of the oblique side of the head comes against it. Thus the die acts as a stop for the nails, and likewise holds or presses on them as they are fed under it. P is the head-holder, which consists of a short bar of steel pivoted to the stock of the former O, and projecting downward to a point above the head of the nail to prevent it from being forced upward by the tendency of the nail to bend under the action of the roller-die. This holder, being fixed on a pivot, Q, at the upper end, is pushed forward toward the screw A by the end of the bar M at the time the nail is being received, or just before, so that the lower end is elevated enough to allow the head of the nail to pass under it freely; but as soon as the roller-die moves back to act on the nail the said lower end is brought on the nail-head by the vibrating arm Q, pivoted at R to the movable stock S of the movable die K, and holds the nail from bending upward until the action of the roller-die ceases and it passes off the point; then the die K is withdrawn by a spring, T, releasing the nail both from it and the head-holder P, and it is discharged by a pusher, U.

These devices may be operated by any suitable or approved arrangement of driving-gear; but in this example I have represented a driving-shaft at A′, with a train of gears, B′, for working the feed-screw; a cam, C′, lever D′, jointed connecting-bar F′, stud G′, and a spring, H′, for working the pusher; a crank-pin, I′, and a yoke for it in the end of the reciprocating roller-die bar M for working it; a cam, K′, and the spring T for working the movable clamping die-stock S′; a cam, $L^1$, push-bar M′, and vibrating bar Q for moving the head-holder P back over the head of the nail; and a slotted stud, N′, on the bar M′ and the curved lever O′ for working the pusher, all being arranged as shown in the drawing. The cam $L^1$ is so adjusted to the crank which actuates the roller-die bar M that the low part $L^2$ passes the end of push-bar M′ at the time the roller-die is in the forward position over the bed-die, allowing said bar M′ to recede and allow the head-holder M to be moved forward by said die-bar to allow the nail to be pushed in, and the cam C′ for actuating the pusher is arranged in such relation to the said crank-pin that the pusher G is actuated to push the nail under the roller-die while the latter is in the said forward position.

Having thus described my invention, what I claim as new, and desire to secure by Letters Patent, is—

1. The combination of the scroll-shaped or approximately scroll-shaped guide B C with the feed-screw, substantially as specified.

2. The combination of the horizontally-acting pusher G with the roller and bed dies, the said pusher and roller-die and the operating devices therefor being arranged in such relation that said die is first caused to advance over the bed-die, and the nail then fed forward, point foremost, beneath the roller-die, until its head comes in contact with it, when the backward movement of the roller-die is commenced, in the manner herein described.

3. The combination of the pivoted or swinging head-holder with the bed-die and roller-die, substantially as specified.

HARRY A. WILLS.

Witnesses:

A. W. KINGSLAND,
C. A. HOUGHTON.